United States Patent [19]

Calfo et al.

[11] 4,118,645
[45] Oct. 3, 1978

[54] DUAL POSITION AIR GAP BAFFLE ASSEMBLY FOR A DYNAMOELECTRIC MACHINE

[75] Inventors: Raymond M. Calfo, Pittsburgh; George F. Dailey, Plum Borough; Gerald R. Alkire, New Alexandria; Arthur Mulach, Penn Hills, all of Pa.

[73] Assignee: Westinghouse Electric Corp., Pittsburgh, Pa.

[21] Appl. No.: 785,979

[22] Filed: Apr. 8, 1977

[51] Int. Cl.² .............................................. H02K 9/00
[52] U.S. Cl. ...................................... 310/53; 310/260
[58] Field of Search ....................... 310/53, 58, 59, 62, 310/52, 63, 64, 256, 65, 260, 66, 270, 54; 251/208

[56] References Cited
U.S. PATENT DOCUMENTS 1,191,700  7/1916  Howes .................................. 310/208
3,320,452  5/1967  Fortenbach .......................... 310/260
3,969,643  7/1976  Sapper .................................. 310/53

FOREIGN PATENT DOCUMENTS 2,315,840  9/1974  Fed. Rep. of Germany .......... 310/260

Primary Examiner—R. Skudy
Attorney, Agent, or Firm—J. W. Keen

[57] ABSTRACT

Disclosed is a dynamoelectric machine with a tubular shaped stator assembly having a generally cylindroid rotor assembly mounted therein. There is a clearance between the outer circumference of the rotor and the inner circumference of the stator for the passage of cooling gas. On one end of the stator assembly there is mounted a dual position air gap baffle assembly. In one position the baffle assembly will regulate the flow of cooling gas in the clearance space between the dynamoelectric machine's stator and rotor; and in the other position, there is a keystone shaped opening which will make the rotor assembly accessible.

13 Claims, 4 Drawing Figures

DUAL POSITION AIR GAP BAFFLE ASSEMBLY FOR A DYNAMOELECTRIC MACHINE

BACKGROUND OF THE INVENTION

1. Field of the Invention

This invention relates to dynamoelectric machines incorporating an air gap baffle assembly.

2. Description of the Prior Art

As is well known, large dynamoelectric machines, such as turbine generators, generate heat when they are in operation due to the internal losses of the machine. To keep the machine operating within desirable temperature limits, a cooling gas, such as hydrogen, is forced through the machine to carry away the heat that is generated by these losses. Most large dynamoelectric machines have, incorporated in the design, provisions for the necessary blower assemblies, heat exchangers, and passageways to insure adequate circulation of the cooling gas which maintains the temperature of the machine, during operation, within acceptable limits. In order to keep the region of the rotor body and the stator bore cool, (this area being commonly referred to as the air gap, whether or not air is the cooling gas) a fixed amount of cooling gas, e.g., hydrogen, is required to flow axially through the air gap. Since the blower on the dynamoelectric machine operates at a required pressure and associated volumetric flow rate, to insure adequate cooling of the entire machine, the cooling gas flowing through the air gap must be regulated to a predetermined flow rate. The standard means of regulation is to insert a restrictive device or baffle at the entrance of the air gap area. This device must provide a preset controllable entrance area to the air gap with a minimum amount of leakage through secondary passages.

FIGS. 1 and 2 are schematic diagrams of the prior art with FIG. 1 being a partial section view of a stator assembly, the baffle ring, and the rotor. FIG. 2 is an end view of the baffle ring and rotor with the stator removed. In FIG. 1 the portions of the stator assembly 100 that are shown are the end pack 105, finger plate 102 and the coil 103. The prior art baffle ring 104 is seated approximately 1 inch into the bore of the machine where a seal is made between the ring and the stator's end pack 105 with impregnated Dacron felt pad 112. The baffle ring is held in place by inserting under every other coil of the stator winding 103 a resin impregnated Dacron pad 114 and the baffle ring is tied in place by use of rope ties (not shown) which are secured through holes 110. The regulation of gas flow through the air gap is controlled through the use of a neoprene rubber insert seal 108. Because in the installation and removal of the rotor assembly it is necessary to insert tools underneath the rotor, there is a keystone area 107 cut out of the seal 108.

On the previous design as shown in FIGS. 1 and 2, the baffle ring was seated approximately one inch into the bore of the machine where a seal was made between the ring and the stator bore with impregnated Dacron felt pad, as was discussed earlier. Since the quality of the seal depended entirely upon the skill of the workmen, the secondary leakage area was somewhat undeterminable and variable from machine to machine. It was also difficult to assemble the felt and at the same time, hold the baffle ring in the desired axial and radial location.

Another drawback with the prior art design is that the baffle ring covered some of the stator iron, iron that is relatively easily damaged since it is at the end of the stator bore. There are other problems encountered by covering the end pack of the stator assembly. For example, inspection by the use of thermovision is very difficult and also, as dynamoelectric machines have increased in size, it has become necessary to provide radial vents in the first end pack of the stator core for additional cooling. Of course, this is impossible with the prior art baffle ring.

Still another problem with the prior art is that in order to prevent the rubber seal from swelling in the presence of oil vapor, it is necessary that the rubber seal by truly oil-resistant and made out of material such as Viton or fluorosilicone. These grades of rubber are quite expensive.

It is a design criterion that the rotor be accessible for the assembly and disassembly tools. In order to do this, there is a keystone notch 107 at the base of the baffle ring. This means that on machines with large air gaps the entrance area in the region of the keystone opening become so large that the regulation of cooling gas flow becomes practically impossible.

SUMMARY OF THE INVENTION

Disclosed is a dynamoelectric machine with a tubular shaped stator assembly having a generally cylindroid rotor assembly mounted within. There is a clearance between the outer circumference of the rotor and the inner circumference of the stator for the passage of cooling gas. On one end of the stator assembly there is mounted a dual position air gap baffle assembly. In one position the baffle assembly will regulate the flow of cooling gas in the clearance space between the dynamoelectric machine's stator and rotor; and in the other position, there is a keystone shaped opening which will make the rotor assembly accessible.

The dual position air gap baffle is made up of two plates. One plate is generally tubular shaped having a keystone shaped notch on its inner periphery. The second plate is a C-shaped plate that is rotatably mounted on the obverse side of the first plate so that the keystone notch on the first baffle may be exposed or covered by the position of the C-shaped baffle plate. There is a groove in the generally tubular shaped baffle plate to align and retain the C-shaped baffle plate. The C-shaped baffle plate is flexible so that it can easily be inserted in the groove of the tubular shaped baffle plate and removed easily. Thus, when in operation, the C-shaped baffle plate can be rotated so that the keystone shaped notch in the tubular shaped baffle plate is closed thereby providing a means to efficiently regulate the flow of cooling gas.

In addition, it is possible to have two lands separated by a furrow along the inner periphery of the C-shaped baffle ring. These lands are designed so that the air gap flow can be preset to a desired amount by properly sizing of the lands. The C-shaped baffle plate can be secured in place by the use of nonmagnetic type fasteners.

The elimination of secondary gas flow is accomplished by a seal between the generally tubular shaped baffle plate and the finger plates of the dynamoelectric machine's stator. An expandable Teflon-coated silicone rubber hose is inserted in a groove around the outer circumference of the generally tubular shaped baffle plate. The hose will serve as a gasket and it is filled with resin after it is inserted to insure that the secondary leakage area between the finger plate and the baffle is properly sealed.

The baffle assembly is held in place by tying it to the windings of the stator coil. This is accomplished by placing resin impregnated dacron pads under every other coil of the stator winding. The generally tubular shaped baffle has holes for running rope ties through and securing the assembly to the stator coils sandwiching the Dacron pads between the stator's coils and the baffle plate.

With this invention, the disadvantages of the prior art will be eliminated. When the inner baffle ring is rotated to the running position, the large keystone area at the bottom of the outer ring is closed with the result that the flow area around the periphery of the ring is much more uniform than in the prior art. Therefore, the flow rate and cooling, especially in the end pack area, is more uniform. Also, the flow area remains constant over the life of the machine; therefore, the air gap flow remains constant. However, it is possible to change the flow rate in the air gap. Since the inner ring is removable, its clearance can easily be altered.

The expandable Teflon-coated silicone hose produces a consistently tight seal against the coil, finger plates, and ends of the core, yet, the end pack can be inspected with thermovisions or other instruments and repaired if necessary.

More clearance is available to remove the rotor in and out of the stator since the inner ring can be removed. Also, if it is necessary, the application of radial vents to the end pack of solid core dynamoelectric machines is now possible.

BRIEF DESCRIPTION OF THE DRAWINGS

The invention will be more fully understood from the following detailed description, taken in connection with the accompanying drawings, in which.

DETAILED DESCRIPTION OF THE PREFERRED EMBODIMENTS

Figure 1:
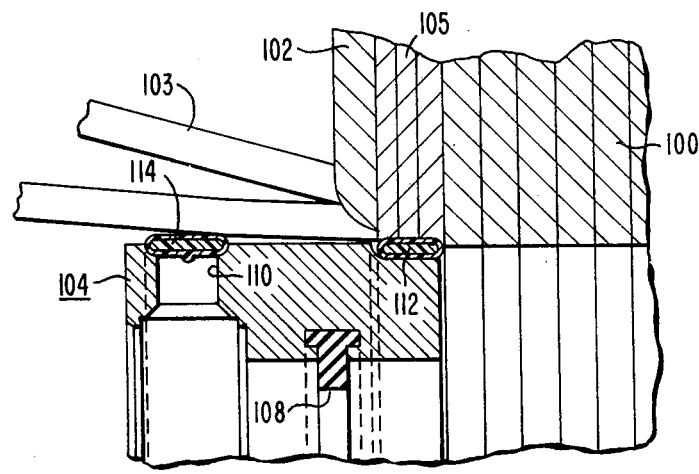
FIG. 1 is a partial schematic of a dynamoelectric machine showing a section of the prior art baffle assembly in relationship to the stator end region and the rotor assembly.
Figure 2:
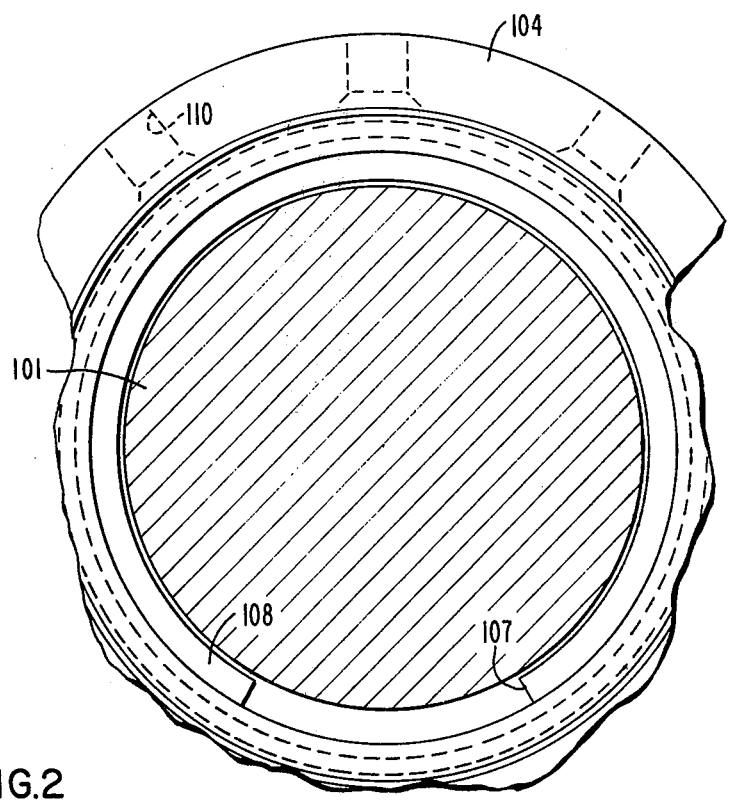
FIG. 2 is an end view of a prior art baffle assembly with the stator assembly removed.
Figure 3:
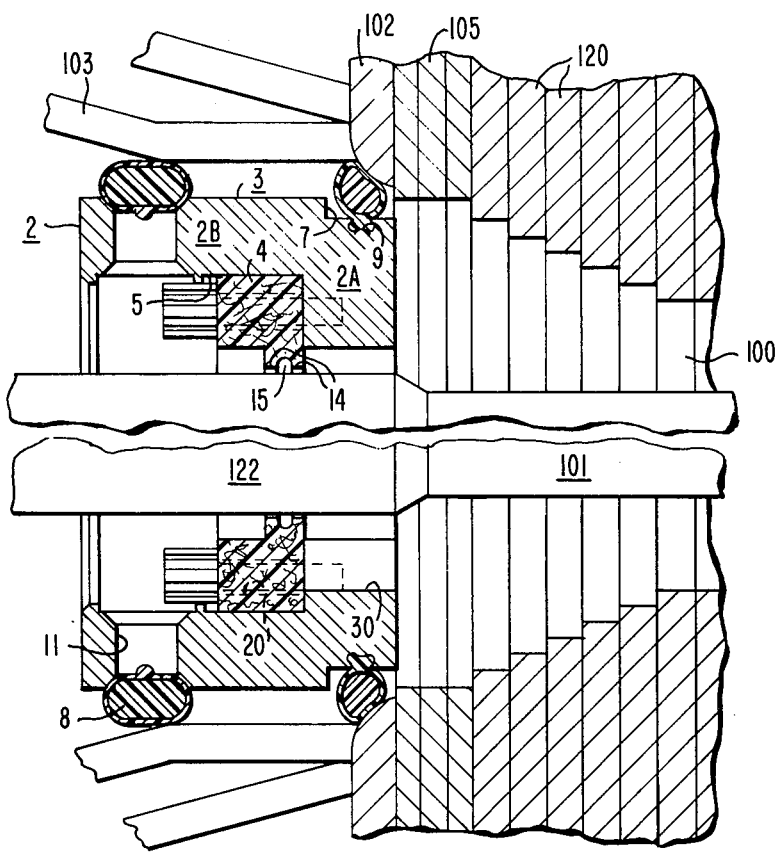
FIG. 3 is a side view of a section of a dynamoelectric machine which has incorporated a dual position air gap baffle at its end region.

FIG. 3 is a schematic view illustrating the embodiments of this invention. There is a generally tubular shaped stator assembly 100 which has mounted within its inner bore a generally cylindroid rotor assembly 101. On the end of the dynamoelectric machine as shown in FIG. 3 there is mounted a dual position air gap baffle 2.

The stator assembly is made up of a plurality of laminations 120 which are stacked together. On each end there is an end pack 105 and a finger ring 102. The laminations, end pack, and finger ring have a plurality of slots around their inner periphery so that when the stator is assembled, there is a plurality of longitudinal grooves around its inner periphery. Dispersed within these grooves are the stator windings 103 which extend longitudinally outward from the finger plates on each end. The area on each side of the slots around the stator's inner periphery is called the end iron region which is not shown. The rotor assembly 101 extends through the stator core and on each end has a retaining ring 122. The area between the stator core and the rotor is the air gap.

The stator's end iron region, due to the magnetic field when the machine is operating, will heat up. In order to prevent damage to the machine, cooling gas is forced down through the radial vent to remove any heat from the stator end iron region. It is desirable that a fixed amount of cooling gas flow axially between the rotor body and the stator bore, through the air gap, in order to carry away the heat that is generated by the losses in the stator bore and rotor surface. Since the blower (not shown) on the dynamoelectric machine operates at a required pressure and produces an associated volumetric flow rate of cooling gas, the cooling gas flowing through the air gap must be regulated to a desired flow rate. The standard means of regulating this flow is to insert a restrictive device or baffle at the entrance of the air gap. This device has to provide a preset controllable entrance area to the air gap with a minimum amount of leakage to any existing secondary passages.

In the preferred embodiment as shown in FIG. 3, there is a dual position air gap baffle 2 inserted on one end of the stator bore. This dual position air gap baffle assembly overcomes the problem discussed above with the prior art. There is a stationary generally tubular shaped outer air gap baffle plate 3 of a non-magnetic material such as a resin impregnated glass filament wound ring, with grooves 7 and 5 machined in it. Groove 5 will contain a rotatable C-shaped inner baffle plate 4 and groove 7 is designed to contain an expandable Teflon-coated silicone rubber hose 6.

The outer baffle plate 3 is symetrical, except for a keystone notch 30 of approximately 70° which extends radially outwards a distance which will coincide to the inner diameter of the stator bore. This keystone shaped notch is required so that the rotor assembly tools, skid plates and support blocks can easily pass over the baffle ring during assembly without risk of damage. The outer baffle plate is essentially a ring 2A with an annular extension 2B. In addition to providing a groove 5 for the insertion of the inner baffle 4, 2B also has a plurality of holes 11 around its circumference. These holes are designed to line up under every other coil of the stator winding 103; and their function is to provide a means for securing the baffle assembly to the stator windings. A Dacron resin-impregnated pad 8 is inserted between a coil of the stator winding and a rope tie hole of the air gap baffle. A rope (not shown) is inserted through the hole 11 over the stator winding binding the air gap baffle to the stator winding and compressing the resin-impregnated dacron pad 8.

The secondary leakage area is sealed by use of the fabric reinforced expandable Teflon-coated silicone rubber hose 6 which seals the area between the outer baffle plate 2 and the stator's finger plate 102. There is an annular recess or groove 7 machined around the outer circumference of the air gap baffle 2 to provide a retaining groove for the rubber hose. In order to retain the rubber hose to the air gap baffle 2 there is a dovetail groove 9 machined in the annular recess 7. The expandable Teflon-coated silicone rubber hose 6 is forced to fill the dovetail groove and seal the secondary air leakage between the air gap baffle and the finger plate when resin is pumped into the hose, causing the hose to expand, creating a seal.

The C-shaped baffle plate 4 is designed to be arch-bound within the machined groove 5 of the baffle plate. To insure that a regulation of the air flow through the air gap and also to enable the designer to have greater flexibility, the C-shaped baffle plate 4 has two lands 14 extending radially inward and around the inner circumference of the C-shaped baffle plate. The two lands are separated by furrow 15.

Figure 4:
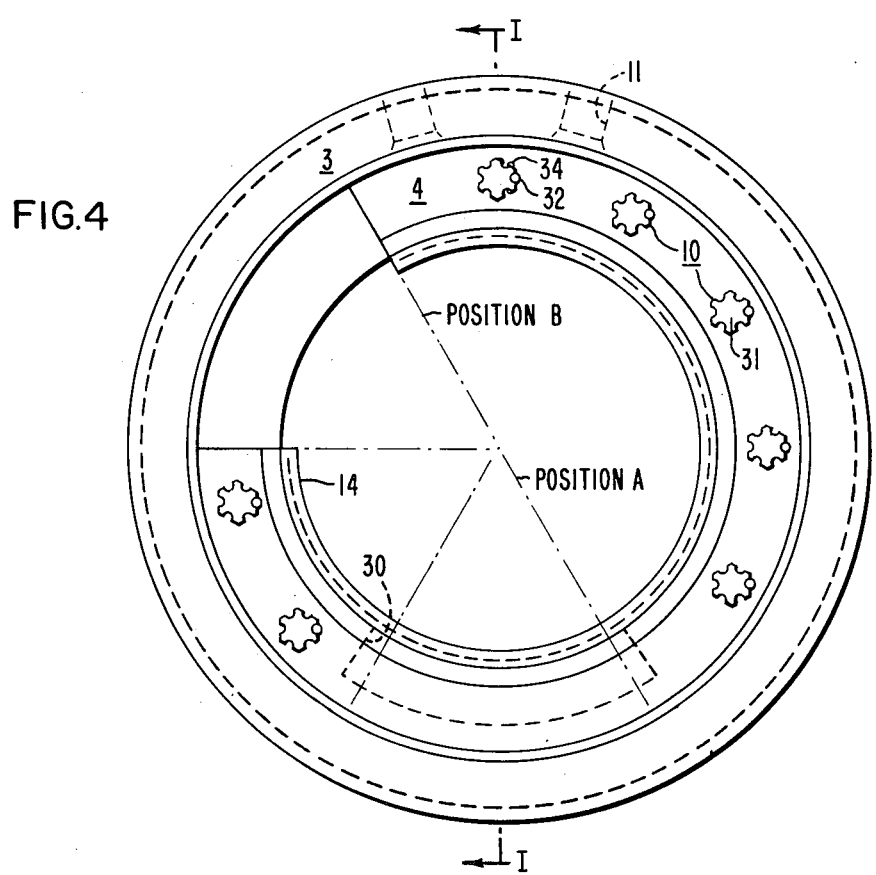
FIG. 4 is a schematic diagram of a dual position air gap baffle.

The baffle assembly 2 is shown in FIG. 4 which can be related to FIG. 3 by section lines I—I. In position A which is shown by dotted lines on FIG. 4, there is a 60° keystone shaped opening 30 at the bottom of the air baffle assembly. As discussed earlier, this is to facilitate the insertion of assembly tools and other equipment used during the assembly and maintenance of the dynamoelectric machine. Position B is the run position and the C-shaped baffle is rotated to this position when the dynamoelectric machine is in operation. The C-shaped plate is made of a non-magnetic material, such as resin impregnated wound glass filaments, and is flexible so that it can easily be released from groove 5 and removed or rotated with or without the rotor in the stator.

When the dynamoelectric machine is in operation, a large aerodynamic force, such as 100 lbs., is present in the direction of the air gap flow and this force acts to hold the inner C-shaped baffle plate up against the outer baffle plate shoulder. However, to preclude any relative motion between the two plates, the C-shaped inner plate is arch-bound and bolted to the outer ring using glass filament bolts. Arch-binding can be accomplished with the aid of a ring compression tool. The ring compression tool should be able to apply compression force of 600 lbs. to the C-shaped ring. Before the tool is released, the seven glass filament bolts 10 are torqued and locked with hollow pins 32 as shown in FIG. 4. Each of the aforementioned seven bolts 10 has a notched head 31 to facilitate the insertion of retaining pins. After the bolt torque is applied, the locking pins 32 for each bolt are inserted to any one of the five holes 34 which are located around the seven bolt clearance holes 20 on the C-shaped baffle plate. One of these pin holes should be near enough to a notch in the bolt head to facilitate the insertion of the pins. To remove the bolts, a counter-torque is applied to the nuts to shear the pins. The C-shaped baffle plate can then be easily removed, placed on a bench, and the old pins drilled out using the holes in the pins as drill guides. The reason for using glass filament bolts is that they do not heat up under the action of the magnetic field.

It should be noted that the expandable Teflon-coated silicone rubber hose 6 provides a uniform seal around the outer circumference of the baffle plate assembly. With this type of seal, it is now possible to remove the air gap baffle plate off the core which will permit the addition of a radial vent. This hose, as stated before, is, for example, made of silicone rubber with two-ply Nomex cord with an outer teflon coating. The silicone rubber permits a 130° C. continuous operation and the Teflon coating protects the silicone rubber hose from deterioration if exposed to the turbine oil vapor which is often found in dynamoelectric machines.

We claim:

1. A dynamoelectric machine with a dual position air gap baffle comprising:
   a generally tubular shaped stator assembly with a plurality of stator windings disposed therein;
   a generally cylindroid rotor assembly axially and rotatably mounted within said stator with an air gap space between the outer circumference of said rotor and the inner circumference of said stator;
   a dual position air gap baffle assembly rotatably mounted over said air gap on one end of said stator and for regulating air flow in said air gap in one position and the other allowing for access to said rotor assembly;
   means for sealing said air gap baffle to one end of said stator.

2. The dynamoelectric machine according to claim 1 wherein said dual position air gap baffle further comprises:
   a generally tubular shaped first baffle plate of nonmagnetic material having a keystone shaped notch on its inner periphery;
   a C-shaped second baffle rotatably mounted on the obverse side of said first baffle so that the keystone notch of said first baffle may be exposed or covered by the rotatably positioning of said C-shaped second baffle.

3. The dynamoelectric machine according to claim 2 wherein said dual position air gap baffle further comprises:
   a generally tubular shaped baffle plate of nonmagnetic material with a keystone notch on its inner periphery and an annular extension around the outer circumference of said plate's obverse side, said annular extension having a groove around its inner periphery;
   a C-shaped baffle of non-magnetic material is rotatably mounted in said annular extension's groove of said tubular shaped baffle plate.

4. The dynamoelectric machine according to claim 3 wherein said dual position air gap baffle further comprises:
   said generally tubular shaped baffle plate of non-magnetic material with a keystone shaped notch on its inner periphery;
   an annular extension around the outer circumference of said plate's obverse side and a plurality of fastener receptacles around said plate's obverse side on a bolt circle;
   said C-shaped baffle plate of non-magnetic material with a plurality of fastener clearance holes on a bolt circle;
   said C-shaped plate being rotatably mounted in said annular extension's groove of said tubular shaped baffle plate wherein said clearance holes are alignable with said fastener holes and a plurality of fasteners for securing said C-shaped baffle plate in said air flow regulation position when said clearance holes all lined up with said fastener holes.

5. The dynamoelectric machine according to claim 4 wherein said C-shaped baffle plates and fasteners further comprise:
   said C-shaped baffle plate of non-magnetic material with said plurality of fastener clearance holes on a bolt circle and around each clearance hole is a plurality of pin holes;
   a plurality of fasteners with notch heads; and
   a plurality of pins which are insertable in one of said pin holes around each clearance hole through one of said notches of said fastener's head, preventing said fastener from rotating after said fastener is inserted and secured in said fastener clearance hole and said fastener receptacle.

6. A dual position air gap baffle according to claim 2 further comprising:

said generally tubular shaped first baffle plate with the keystone notch on the center periphery and annular extension around the outer circumference of said plate's obverse side, said annular extension having a groove around its inner periphery;

a C-shaped baffle plate of non-magnetic material being rotatably mounted in said annular extension's groove of said first tubular shaped baffle plate.

7. A dynamoelectric machine with a dual position air gap baffle comprising:

a generally tubular shaped stator assembly with a plurality of longitudinal slots around said stator inner periphery and a plurality of stator windings dispersed therein and extending longitudinally outward from said stator's ends;

a generally cylindroid rotor assembly axially and rotatably mounted within said stator with an air gap clearance between the outer circumference of said rotor and the inner circumference of said stator;

a dual position air gap baffle for regulating the air flow in said air gap in one position and in the other position allowing for access to said rotor;

means for sealing secondary leakage between said dual position air gap baffle and said stator and means for securing said air gap baffle over said air gap on one end of said stator.

8. The dynamoelectric machine according to claim 7 wherein said means for sealing said dual position air gap baffle and said secondary leakage between said dual position air gap baffle when said stator comprises:

said generally tubular shaped first baffle plate of non-magnetic material with a keystone notch on its inner periphery and an annular recess around said plate's outer circumference on said plate's reverse end;

an expandable gasket mounted in said annular recess of said first baffle plate sealing the void between said first baffle plate and said stator; and means for securing said gasket in place.

9. The dynamoelectric machine according to claim 7 wherein said means for securing the gasket in place further comprises:

a generally tubular shaped first baffle plate of non-magnetic material with a keystone notch on its inner periphery and an annular recess with a gasket retaining groove located within said annular recess; and an expandable gasket with a retaining land around its inner periphery which fits in said restraining groove and restrains said gasket therein.

10. The dynamoelectric machine according to claim 7 wherein said dual position air gap baffle and said means for securing said dual position air gap baffle over said air gap on one end of said stator comprises:

a generally tubular shaped first baffle plate of non-magnetic material with a keystone shaped notch on its inner periphery and an annular extension extending outward and around the outer circumference of the obverse side of said plate and said annular extension having a plurality of holes around the circumference thereof;

a plurality of resin impregnated pads dispersed around the outer periphery of said annular extension with each pad covering one of said plurality of holes; and a rope means for securing said baffle to said stator windings by compressing and securing said pad between said baffle and said windings.

11. The dynamoelectric machine according to claim 7 wherein said dual position air gap baffle further comprises:

said generally tubular shaped baffle plate of nonmagnetic material with a keystone shaped notch on its inner periphery and an annular extension around the outer circumference of said plate's obverse side and a plurality of fastener receptacles around said plate's obverse side on a bolt circle;

said C-shaped baffle plate of non-magnetic material with a plurality of fastener clearance holts on a bolt circle;

said C-shaped plate rotatably mounted in said annular extension groove of said tubular shaped baffle plate wherein said clearance holes are alignable with said fastener holes and a plurality of fasteners for securing said C-shaped baffle plate in said air flow regulation position when said clearance holes are aligned with said fastener holes.

12. The dynamoelectric machine according to claim 7 wherein said C-shaped baffle plate and fastener further comprise:

said C-shaped baffle plate of non-magnetic material with a plurality of fastener clearance holes on a bolt circle and around each clearance hole is a plurality of pin holes;

a plurality of fasteners with notch heads and a plurality of pins which are inserted in one of said pin holes around each clearance hole through one of said notches in said fastener head preventing said fasteners from rotating after said fastener is inserted and secured in said fastener clearance hole and said fastener's receptacle.

13. A dynamoelectric machine with a dual position air gap baffle comprising:

a generally tubular shaped stator assembly with a plurality of longitudinal slots around said stator's inner periphery and a plurality of stator windings dispersed therein and extending longitudinally outward from said stator's ends;

a generally cylindroid rotor assembly axially and rotatably mounted within said stators with an air gap clearance between said outer circumference of said rotor and the inner circumference of said stators;

a generally tubular shaped first baffle plate of non-magnetic material with a keystone notch on its inner periphery and an annular recess around its outer circumference on its reverse side with a gasket restraining groove located within said annular recess, an annular extension extending outward and around the outer periphery of said baffle plate containing a groove therein and a plurality of holes around the circumference of said annular extension, and a plurality of fastener receptacles around said plate's obverse side on a bolt circle;

a C-shaped baffle plate of non-magnetic material with a plurality of fastener clearance holes on the bolt circle, around each fastener clearance hole there is a plurality of pin holes and said C-shaped baffle plate is rotatably mounted within said annular extension's groove of said generally tubular shaped baffle plate;

a plurality of non-magnetic fasteners with notched heads;

a plurality of pins for inserting through notch heads of said fasteners into said pin holes of each of said fastener clearance holes when said fasteners are inserted and secured through said fastener clearance holes and fastener receptacles; and oil resistant expandable gasket mounted in said angular recess of said generally tubular shaped baffle plate and secured in said gasket securing groove and said gasket being filled with a compressible liquid so that there is a seal between the generally tubular shaped baffle plate and said stator assembly;

a plurality of pads; and a plurality of ties for securing said generally tubular shaped baffle plate to said stator windings and compressing said pads in-between therein by running said ties through said pluralities of holes in said annular extension.

* * * * *